US007660783B2

(12) United States Patent
Reed

(10) Patent No.: US 7,660,783 B2
(45) Date of Patent: Feb. 9, 2010

(54) SYSTEM AND METHOD OF AD-HOC ANALYSIS OF DATA

(75) Inventor: Mark William Reed, Fort Thomas, KY (US)

(73) Assignee: Buzzmetrics, Inc., New York, NY (US)

( * ) Notice: Subject to any disclaimer, the term of this patent is extended or adjusted under 35 U.S.C. 154(b) by 0 days.

(21) Appl. No.: 11/897,984

(22) Filed: Aug. 31, 2007

(65) Prior Publication Data

US 2008/0077582 A1    Mar. 27, 2008

Related U.S. Application Data

(60) Provisional application No. 60/847,486, filed on Sep. 27, 2006.

(51) Int. Cl.
*G06F 17/30* (2006.01)

(52) U.S. Cl. ............................. 707/2; 707/3; 707/100; 707/200; 711/111

(58) Field of Classification Search ............... 707/2, 707/3, 5, 100, 102, 200, 205; 711/111
See application file for complete search history.

(56) References Cited

U.S. PATENT DOCUMENTS

| | | | |
|---|---|---|---|
| 3,950,618 A | 4/1976 | Bloisi | |
| 5,041,972 A | 8/1991 | Frost | |
| 5,077,785 A | 12/1991 | Monson | |
| 5,124,911 A | 6/1992 | Sack | |
| 5,301,109 A | 4/1994 | Landauer et al. | |
| 5,317,507 A | 5/1994 | Gallant | |
| 5,321,833 A | 6/1994 | Chang et al. | |
| 5,371,673 A | 12/1994 | Fan | |
| 5,495,412 A | 2/1996 | Thiessen | |
| 5,519,608 A | 5/1996 | Kupiec | |
| 5,537,618 A | 7/1996 | Boulton et al. | |
| 5,659,732 A | 8/1997 | Kirsch | |
| 5,659,742 A | 8/1997 | Beattie et al. | |

(Continued)

FOREIGN PATENT DOCUMENTS

EP    1052582    11/2000

(Continued)

OTHER PUBLICATIONS

International Search Report relating to International Patent Application No. PCT/US07/21035, mailed Jul. 1, 2008, 3 pages.

(Continued)

*Primary Examiner*—Fred I Ehichioya
(74) *Attorney, Agent, or Firm*—Hanley, Flight & Zimmerman, LLC

(57) ABSTRACT

It is a first aspect of the present invention to provide a computer implemented method of performing ad-hoc analysis including the steps of: generating a text index of the textual information items, generating a metadata lookup structure based, at least in part, on the text index, searching the text index using a search query, compiling results of the text index search into aggregate information related to characteristics of the search results from the metadata items associated with the textual information items in the search results from the metadata lookup structure, and reporting the aggregate information.

23 Claims, 3 Drawing Sheets

U.S. PATENT DOCUMENTS

| | | |
|---|---|---|
| 5,668,953 A | 9/1997 | Sloo |
| 5,671,333 A | 9/1997 | Catlett et al. |
| 5,675,710 A | 10/1997 | Lewis |
| 5,696,962 A | 12/1997 | Kupiec |
| 5,761,383 A | 6/1998 | Engel |
| 5,794,412 A | 8/1998 | Ronconi |
| 5,819,285 A | 10/1998 | Damico et al. |
| 5,822,744 A | 10/1998 | Kesel |
| 5,836,771 A | 11/1998 | Ho et al. |
| 5,845,278 A | 12/1998 | Kirsch et al. |
| 5,857,179 A | 1/1999 | Vaithyanathan et al. |
| 5,884,302 A | 3/1999 | Ho |
| 5,895,450 A | 4/1999 | Sloo |
| 5,911,043 A | 6/1999 | Duffy et al. |
| 5,920,854 A | 7/1999 | Kirsch et al. |
| 5,924,094 A | 7/1999 | Sutter |
| 5,950,172 A | 9/1999 | Klingman |
| 5,950,189 A | 9/1999 | Cohen et al. |
| 5,953,718 A | 9/1999 | Wical |
| 5,974,412 A | 10/1999 | Hazlehurst et al. |
| 5,983,214 A | 11/1999 | Lang et al. |
| 5,983,216 A | 11/1999 | Kirsch et al. |
| 6,006,221 A | 12/1999 | Liddy et al. |
| 6,012,053 A | 1/2000 | Pant et al. |
| 6,021,409 A | 2/2000 | Burrows |
| 6,026,387 A | 2/2000 | Kesel |
| 6,026,388 A | 2/2000 | Liddy et al. |
| 6,029,161 A | 2/2000 | Lang et al. |
| 6,029,195 A | 2/2000 | Herz |
| 6,032,145 A | 2/2000 | Beall et al. |
| 6,035,294 A | 3/2000 | Fish |
| 6,038,610 A | 3/2000 | Belifore et al. |
| 6,064,980 A | 5/2000 | Jacobi et al. |
| 6,067,539 A | 5/2000 | Cohen |
| 6,078,892 A | 6/2000 | Anderson et al. |
| 6,094,657 A | 7/2000 | Halipern et al. |
| 6,098,066 A | 8/2000 | Snow et al. |
| 6,112,203 A | 8/2000 | Bharat et al. |
| 6,119,933 A | 9/2000 | Wong |
| 6,138,113 A | 10/2000 | Dean et al. |
| 6,138,128 A | 10/2000 | Perkowitz et al. |
| 6,169,986 B1 | 1/2001 | Bowman et al. |
| 6,185,558 B1 | 2/2001 | Bowman et al. |
| 6,192,360 B1 | 2/2001 | Dumais et al. |
| 6,202,068 B1 | 3/2001 | Kraay et al. |
| 6,233,575 B1 | 5/2001 | Agrawal |
| 6,236,977 B1 | 5/2001 | Verba et al. |
| 6,236,987 B1 | 5/2001 | Horowitz et al. |
| 6,236,991 B1 | 5/2001 | Frauenhofer et al. |
| 6,260,041 B1 | 7/2001 | Gonzalez |
| 6,266,664 B1 | 7/2001 | Russell-Falla et al. |
| 6,269,362 B1 | 7/2001 | Broder et al. |
| 6,278,990 B1 | 8/2001 | Horowitz |
| 6,289,342 B1 | 9/2001 | Lawrence et al. |
| 6,304,864 B1 | 10/2001 | Liddy et al. |
| 6,308,176 B1 | 10/2001 | Bagshaw |
| 6,314,420 B1 | 11/2001 | Lang et al. |
| 6,334,131 B2 | 12/2001 | Chakrabarti et al. |
| 6,360,215 B1 | 3/2002 | Judd et al. |
| 6,362,837 B1 | 3/2002 | Ginn |
| 6,366,908 B1 | 4/2002 | Chong et al. |
| 6,377,946 B1 | 4/2002 | Okamoto et al. |
| 6,385,586 B1 | 5/2002 | Dietz |
| 6,393,460 B1 | 5/2002 | Gruen et al. |
| 6,401,118 B1 | 6/2002 | Thomas |
| 6,411,936 B1 | 6/2002 | Sanders |
| 6,418,433 B1 | 7/2002 | Chakrabarti et al. |
| 6,421,675 B1 | 7/2002 | Ryan et al. |
| 6,434,549 B1 | 8/2002 | Linetsky et al. |
| 6,493,703 B1 | 12/2002 | Knight et al. |
| 6,507,866 B1 | 1/2003 | Barchi |
| 6,513,032 B1 | 1/2003 | Sutter |
| 6,519,631 B1 | 2/2003 | Rosenschein et al. |
| 6,526,440 B1 | 2/2003 | Bharat |
| 6,539,375 B2 | 3/2003 | Kawasaki |
| 6,546,390 B1 | 4/2003 | Pollack et al. |
| 6,553,358 B1 | 4/2003 | Horvitz |
| 6,571,234 B1 | 5/2003 | Knight et al. |
| 6,571,238 B1 | 5/2003 | Pollack et al. |
| 6,574,614 B1 | 6/2003 | Kesel |
| 6,584,470 B2 | 6/2003 | Veale |
| 6,606,644 B1 | 8/2003 | Ford et al. |
| 6,622,140 B1 | 9/2003 | Kantrowitz |
| 6,640,218 B1 | 10/2003 | Golding et al. |
| 6,651,086 B1 | 11/2003 | Manber et al. |
| 6,654,813 B1 | 11/2003 | Black et al. |
| 6,658,389 B1 | 12/2003 | Alpdemir |
| 6,662,170 B1 | 12/2003 | Dom |
| 6,708,215 B1 | 3/2004 | Hingorani et al. |
| 6,721,734 B1 | 4/2004 | Subasic et al. |
| 6,751,606 B1 | 6/2004 | Fries et al. |
| 6,751,683 B1 | 6/2004 | Johnson et al. |
| 6,757,646 B2 | 6/2004 | Marchisio |
| 6,772,141 B1 | 8/2004 | Pratt et al. |
| 6,775,664 B2 | 8/2004 | Lang et al. |
| 6,778,975 B1 | 8/2004 | Anick et al. |
| 6,782,393 B1 | 8/2004 | Balabanovic et al. |
| 6,795,826 B2 | 9/2004 | Flinn et al. |
| 6,807,566 B1 | 10/2004 | Bates et al. |
| 6,928,526 B1* | 8/2005 | Zhu et al. .................... 711/154 |
| 6,978,292 B1 | 12/2005 | Murakami et al. |
| 6,983,320 B1 | 1/2006 | Thomas |
| 6,999,914 B1 | 2/2006 | Boerner et al. |
| 7,146,416 B1 | 12/2006 | Yoo |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,277,919 B1 | 10/2007 | Donoho |
| 2001/0042087 A1 | 11/2001 | Kephart et al. |
| 2002/0010691 A1 | 1/2002 | Chen |
| 2002/0032772 A1 | 3/2002 | Olstad et al. |
| 2002/0059258 A1 | 5/2002 | Kirkpatrick |
| 2002/0087515 A1 | 7/2002 | Swannack |
| 2002/0123988 A1 | 9/2002 | Dean et al. |
| 2002/0133481 A1 | 9/2002 | Smith et al. |
| 2002/0159642 A1 | 10/2002 | Whitney |
| 2003/0070338 A1 | 4/2003 | Roshkoff |
| 2003/0088532 A1 | 5/2003 | Hampshire |
| 2004/0024752 A1 | 2/2004 | Manber et al. |
| 2004/0059708 A1 | 3/2004 | Dean et al. |
| 2004/0059729 A1 | 3/2004 | Krupin et al. |
| 2004/0078432 A1 | 4/2004 | Manber et al. |
| 2004/0111412 A1 | 6/2004 | Broder |
| 2004/0122811 A1 | 6/2004 | Page |
| 2004/0199498 A1 | 10/2004 | Kapur et al. |
| 2004/0205482 A1 | 10/2004 | Basu et al. |
| 2004/0210561 A1 | 10/2004 | Shen |
| 2005/0049908 A2 | 3/2005 | Hawks |
| 2005/0114161 A1 | 5/2005 | Garg |
| 2005/0125216 A1 | 6/2005 | Chitrapura et al. |
| 2005/0154686 A1 | 7/2005 | Corston et al. |
| 2006/0004691 A1 | 1/2006 | Sifry |
| 2006/0041605 A1* | 2/2006 | King et al. .................... 707/205 |
| 2006/0069589 A1 | 3/2006 | Nigam et al. |
| 2006/0173819 A1 | 8/2006 | Watson |
| 2006/0173837 A1* | 8/2006 | Berstis et al. .................... 707/5 |
| 2006/0206505 A1 | 9/2006 | Hyder et al. |
| 2007/0027840 A1* | 2/2007 | Cowling et al. ................. 707/3 |

FOREIGN PATENT DOCUMENTS

| | | |
|---|---|---|
| WO | 00/17824 | 3/2000 |

WO    WO01/97070    * 12/2001

OTHER PUBLICATIONS

Written Opinion of the International Searching Authority relating to International Patent Application No. PCT/US07/21035, mailed Jul. 1, 2008, 8 pages.

Adamic et al., The political blogosphere and the 2004 U.S. election: Divided they blog, Proceedings WWW-2005 2nd Annual Workshop on the Weblogging Ecosystem, 2005, Chiba, Japan.

Adar et al., Implicit structure and dynamics of blogspace, Proceedings WWW-2004 Workshop on the Weblogging Ecosystem, 2004, New York, NY.

Aliod, Diego Molla, et al., "A Real World Implementation of Answer Extraction", Department of Computer Science, University of Zurich, Winterthurerstr., 1998, 190, CH-8057 Zurich, Switzerland, pp. 1-6.

Archived version of www.bizrate.com, Jan. 1999.

Bishop, Mike, "Arrow Question/Answering Systems", Language Computer Corporation, 1999, pp. 1-3.

Blum, Avrim, "Empirical support for winow and weighted-majority algorithms: Results on a calendar scheduling domain," in Machine Learning, 1997, pp. 5-23, vol. 26, Kluwer Academic Publishers, Boston, USA.

Bournellis, Cynthia, "Tracking the hits on Web Sites", Communications International. London: Sep. 1995. vol. 22, Issue 9, 3 pages.

Cohen, William W., "Data Integration using similarity joins and a word-based information representation language," in ACM Transactions on Information Systems, Jul. 2000, pp. 288-321, vol. 18, No. 3.

Cohn et al., "Active Learning with Statistical Models", Journal of Artificial Intelligence Research 4 (1996), 129-145, Al Access Foundation and Morgan Kaufmann Publishers, USA.

Dagan et al., "Mistake Driven learning in text categorization," in EMNLP '97, 2nd Conference on Empirical Methods in Natural Language Processing, 1997.

Delahaye Group to Offer Net Bench: High Level Web-Site Qualitative Analysis and Reporting; Netbench Builds on Systems provided by I/PRO and Internet Media Services, 1995 business Wire, Inc., May 31, 1995, 3 pages.

www.dialogic.com as archived on May 12, 2000.

Dillon et al., Marketing research in a Marketing Environment, 1987, Times Minor/Mosby College, USA, pp. 98, 286, 288.

eWatch's archived web site retrieved from [URL:http://web.archive.org/web/19980522190526/wwww.ewatch.com] on Sep. 8, 2004, archived May 22, 1998.

Farber, Dave. "IP: eWatch and Cybersleuth," Jun. 29, 2000, retrieved from [URL: http://www.interesting-people.org/archives/interesting-people/200006/msg00090.html].

Freund et al., "Selective Sampling Using the Query by Committee Algorithm", Machine Learning 28 (1997), 133-168, Kluwer Academic Publishers, The Netherlands.

Glance et al., Analyzing online disussion for marketing intelligence, Proceedings WWW-2005 2nd Annual Workshop on the Weblogging Ecosystem, 2005, Chiba, Japan.

Glance et al., Deriving marketing intelligence from online discussion, 11th ACM SIGKDD International Conf. on Knowledge Discovery and Data Mining, Aug. 21-24, 2005, Chicago, IL.

Greffenstette et al., "Validating the coverage of lexical resources for affect analysis and automatically classifying new words along semantic axes," Chap. X, Mar. 2004, pp. 1-15.

Harabagiu, Sanda M., "An Intelligent System for Question Answering", University of Southern California; Modlovan, Dan, Southern Methodist University, 2004, pp. 1-5.

Harabagiu, Sanda M. et al., "Experiments with Open-Domain Textual Question Asnwering", Department of Computer Science and Engineering at Southern Methodist Universtity, 2000, pp. 1-7.

Harabagiu, Sanda M. et al., "Mining Textual Answers with Knowledge-Based Indicators", Department of Computer Science and Engineering at Southern MethodistC University, 2000, pp. 1-5.

Joachims, Thorsten, "Text categorization with support vector machines: Learning with many relevant features," in Machine Learning: ECML-98, Tenth European Conference on Machine Learning, pp. 137-142, 1998.

Kahn et al., Categorizing Web Documents using Competitive Learning;An ingredient of a Personal Adaptive Agent, IEEE;c 1997.

Katz, Boris, "From Sentence Processing to Information Access on the World Wide Web: START Information Server", MIT Artificial Intelligence Laboratory, Feb. 27, 1997.

Kleppner, Advertising Procedure, 6th edition, 1977, Prentice-Hall, Inc., Englewood Cliffs, NJ, p. 492.

Kotler, Marketing Management, 1997, PrenticeHall International Inc., Upper Saddle River, NJ, pp. 617-619, 656-658, 665-667.

Lenz, Mario, et al., "Question answering with Textual CBR", Department of Computer Science, Humboldt University Berlin, D-10099 Berlin, pp. 1-12, 1998.

Littlestone, Nick, "Learning quickly when irrelevant attributes abound: A new linear-threshold algorithm," in Machine Learning, 1988, pp. 285-318, vol. 2, Kluwer Academic Publishers, Boston, USA.

Marlow, Audience, structure and authority in the weblog community, International Communication Association Conference, MIT Media Laboratory, 2004, New Orleans, LA.

McCallum et al., "Text Classification by Bootstrapping with the Keywords, EM and Shrinkage", Just Research and Carnegie Mellon U., circa 1999, Pittsburgh, PA, USA.

McLachlan, Geoffrey J. And Krishnan, Thriyambakam, The EM Algorithm and Extensions, Copyright 1997, pp. 1-274, John Wiley & Sons, Inc., New York, USA.

Modlovan, Dan et al., "LASSO: A Tool for Surfing the Answer Net", Department of Computer Science and Engineering at Southern Methodist University, pp. 1-9, 1999.

Nakashima et al., Information Filtering for the Newspaper, IEE; c1997.

Nanno et al., Automatic collection and monitoring of Japanese Weblogs, Proceedings WWW-2004 Workshop on the weblogging Ecosystem, 2004, New York, NY.

NetCurrent's web site, retrieved from [URL: http://web.archive.org/web/20000622024845/www/netcurrents.com] Jan. 17, 2005, archived on Jun. 22, 2000 and Sep. 18, 2000.

Pang et al., "Thumbs up? Sentiment classification using machine learning techniques," in Proceedings of EMNLP 2002,2002.

Reinartz, Customer Lifetime Value Analysis: An Integrated Empirical Framework for Measurement and Explanation, dissertation: Apr. 1999, pp. 57-118.

Thomas, International Marketing, 1971, International Textbook Company, Scranton, PA, p. 148.

Trigaux, Robert. "Cyberwar Erupts Over Free Speech Across Florida, Nation. "Knight-Ridder Tribune Business News, May 29, 2000.

Tull et al., Marketing Research Measurement and Method, 1984, MacMillan Publishing Company, New York, NY, pp. 102, 103, 114, 115, 200 201 and 256.

Voorhees, Ellen M., "The TREC-8 Question Answering Track Report", National Institute of Standards and Technology, pp. 1-6, 1999.

Wiebe et al., "Identifying collocations for recognizing opinions, in proceedings of ACLl/EACLl '01 workshop on collcation," (Toulouse, France), Jul. 2001.

Word of Mouth Research Case Study, "The Trans Fat Issue, Analysis of online consumer conversation to understand hwo the Oreo lawsuit impacted word-of-mouth on trans fats.", Aug. 16, 2004, 35 pages.

Yang, Yiming, "An evaluation of statistical approacches to text categorization," Information Retrieval 1 (1/2), pp. 67-88, 1999.

www.zagat.com archived on Apr. 29, 1999.

p. 34 of archived version of www.zagat.com, Feb. 1999.

International Bureau, "International Preliminary Report on Patentability", from corresponding International Patent Applicaton No. PCT/IL2006/000905, mailed on Jul. 2, 2007, (5 pages).

Official Action dated Dec. 17, 2008, in U.S. Appl. No. 11/517,417, 6 pages.

Written Opinion of the International Searching Authority, issued in corresponding application No. PCT/US2007/021035, mailed Apr. 9, 2009, 9 pages.

International Search Report dated Jul. 1, 2008, in WO PCT/US2007/021035, 3 pages.

Interview Summary in U.S. Appl. No. 11/651,661, date mailed May 6, 2009, 2 pages.
IPRP dated Jun. 19, 2007, in WO PCT/US2005/035321, 4 pages.
David Chaum & Jan-Hendrik Evertse, "A Secure and Privacy-Protecting Protocol for Transmitting Personal Information Between Organizations", A.M. Odlyzko (Ed.): Advances in Cryptology, Crypto '86, LNCS 263, 1987, pp. 118-167.
David L. Chaum, "Untraceable Electronic Mail, Return Addresses, and Digital Pseudonymns", Communication of the ACM, vol. 24, No. 2, 1981, pp. 84-88.
European Search Report dated Sep. 26, 2007, directed to counterpart EP application No. 02744622.8, 3 pages.
Housley et al., "Internet X.509 Public Key Infrastructure Certificate and CRL Profile", Jan. 1999, Network Working Group Request for Comments: 2459, pp. 1-129.
Official Action dated Apr. 7, 2009, in U.S. Appl. No. 11/454,301, 17 pages.
Official Action dated Apr. 23, 2008, in U.S. Appl. No. 11/364,169, 10 pages.
Official Action dated Apr. 28, 2005, in U.S. Appl. No. 09/879,220, 16 pages.
Official Action dated Apr. 29, 2009, in U.S. Appl. No. 10/801,758, 42 pages.
Official Action dated Apr. 5, 2006, in U.S. Appl. No. 11/239,632, 9 pages.
Official Action dated Apr. 7, 2006, in U.S. Appl. No. 11/239,695, 9 pages.
Official Action dated Aug. 19, 2008, in U.S. Appl. No. 11/517,418, 9 pages.
Official Action dated Aug. 21, 2008, in U.S. Appl. No. 11/245,542, 4 pages.
Official Action dated Aug. 3, 2007, in U.S. Appl. No. 11/651,661, 14 pages.
Official Action dated Aug. 7, 2008, in U.S. Appl. No. 11/710,742, 12 pages.
Official Action dated Dec. 1, 2006, in U.S. Appl. No. 09/879,220, 3 pages.
Official Action dated Dec. 12, 2004, in U.S. Appl. No. 09/879,220, 15 pages.
Official Action dated Dec. 16, 2008, in U.S. Appl. No. 11/245,542, 4 pages.
Official Action dated Dec. 18, 2006, in U.S. Appl. No. 11/239,632, 3 pages.
Official Action dated Dec. 23, 2008, in U.S. Appl. No. 11/372,191, 6 pages.
Official Action dated Dec. 3, 2006, in U.S. Appl. No. 11/239,695, 3 pages.
Official Action dated Dec. 4, 2008, in U.S. Appl. No. 11/651,661, 10 pages.
Official Action dated Dec. 8, 2008, in U.S. Appl. No. 11/710,742, 10 pages.
Official Action dated Feb. 24, 2003, in U.S. Appl. No. 09/796,961, 4 pages.
Official Action dated Jan. 24, 2007, in U.S. Appl. No. 09/686,516, 3 pages.
Official Action dated Jan. 28, 2005, in U.S. Appl. No. 09/686,516, 19 pages.
Official Action dated Jan. 30, 2009, in U.S. Appl. No. 11/710,742, 10 pages.
Official Action dated Jul. 10, 2008, in U.S. Appl. No. 11/364,169, 2 pages.
Official Action dated Jul. 21, 2004, in U.S. Appl. No. 09/695,016, 27 pages.
Official Action dated Sep. 21, 2006, in U.S. Appl. No. 11/239,632, 3 pages.
Official Action dated Jun. 11, 2007, in U.S. Appl. No. 11/364,169, 8 pages.
Official Action dated Jun. 12, 2008, in U.S. Appl. No. 11/245,542, 9 pages.
Official Action dated Jun. 29, 2005, in U.S. Appl. No. 09/686,516, 21 pages.
Official Action dated Jun. 4, 2008, in U.S. Appl. No. 11/651,661, 11 pages.
Official Action dated Mar. 28, 2006, in U.S. Appl. No. 09/879,220, 19 pages.
Official Action dated Mar. 7, 2008, in U.S. Appl. No. 10/801,758, 31 pages.
Official Action dated May 10, 2006, in U.S. Appl. No. 09/686,516, 34 pages.
Official Action dated May 19, 2005, in U.S. Appl. No. 09/695,016, 13 pages.
Official Action dated Nov. 2, 2005, in U.S. Appl. No. 09/695,016, 13 pages.
Official Action dated Nov. 21, 2007, in U.S. Appl. No. 11/239,696, 3 pages.
Official Action dated Nov. 22, 2005, in U.S. Appl. No. 09/686,516, 25 pages.
Official Action dated Oct. 1, 2008, in U.S. Appl. No. 10/801,758, 40 pages.
Official Action dated Oct. 3, 2007, in U.S. Appl. No. 11/710,742, 10 pages.
Official Action dated Sep. 22, 2006, in U.S. Appl. No. 11/239,696, 11 pages.
Official Action dated Sep. 21, 2006, in U.S. Appl. No. 11/239,695, 3 pages.
Official Action dated Sep. 18, 2008, in U.S. Appl. No. 11/454,301, 17 pages.
Notice of Allowance issued in U.S. Appl. No. 11/651,661, mailed May 19, 2009, 29 pages.
Notice of Allowance issued in U.S. Appl. No. 11/517,417, mailed May 29, 2009, 7 pages.
Office Action issued in U.S. Appl. No. 11/710,742, mailed Jun. 8, 2009, 10 pages.
Office Action issued in U.S. Appl. No. 11/710,743, mailed Jul. 29, 2008, 12 pages.
Official Action dated Oct. 8, 2008, in U.S. Appl. No. 11/245,542, 5 pages.
Official Action dated Oct. 9, 2007, in U.S. Appl. No. 11/245,542, 11 pages.
Official Action dated Sep. 12, 2007, in U.S. Appl. No. 11/239,696, 8 pages.
Official Action dated Sep. 18, 2008, in U.S. Appl. No. 11/454,301, 17 pages.
Official Action dated Jan. 12, 2009, in U.S. Appl. No. 11/710,743, 17 pages.

* cited by examiner

SYSTEM AND METHOD OF AD-HOC ANALYSIS OF DATA

CROSS-REFERENCE TO RELATED APPLICATIONS

This application claims the benefit of U.S. Provisional Application Ser. No. 60/847,486, entitled "SYSTEM FOR AD-HOC ANALYSIS OF ONLINE DATA," filed on Sep. 27, 2006, the disclosure of which is incorporated by reference.

FIELD OF THE INVENTION

The present invention is generally directed to providing an improved system and method for ad-hoc analysis of data. Specifically, the present invention implements a metadata lookup structure to assist in data analysis.

BACKGROUND OF THE INVENTION

Today, there are vast amounts of unstructured data on the Internet. There is a great need to be able to search and analyze this data in order uncover useful information about particular areas of interest. This is not only desired by consumers who want to find information about people and products, but also by companies that want to know what their customers are saying about their products and services.

Traditionally, there have been two approaches to this problem. One approach is the "search approach." With the search approach, textual data is collected and stored in a full-text index that allows for rapid searching of the data. Large public Internet portals (such as Google, Yahoo, etc.) as well as numerous commercial indexing solutions support this functionality.

A second approach to this problem is the "analytical approach." The analytical approach allows for analysis by collecting items and running these items through various text mining algorithms to extract additional metadata information. This additional processing may include language detection, extraction of links to other data, or determining the sentiment of the author. This derived metadata information is typically stored in a relational database which allows for aggregate analytics such as what websites are linked by the data. Typically, these analytics are preconfigured to extract information relevant to the goal of the system.

The advantage of the search approach is speed and simplicity. Without any pre-configuration, a full text index allows ad-hoc searching of the data. For instance, if someone wants to find textual data about a particular movie, they can simply search for the title of the movie and find it. However, the search approach does not give deeper insights such as what websites are linked or how people feel about the movie. The analysis approach can provide this type of information, but it typically requires a separate time-consuming text mining step. Therefore, the analysis approach lacks the speed and simplicity needed for "ad-hoc" analysis.

Therefore, there is a need for a solution that combines the speed of the search approach and the deep insights of the analytical approach to provide for true ad-hoc analysis. Aspects of the present invention address this need.

SUMMARY OF THE INVENTION

Aspects of the present invention address this need by providing an improved system and method for ad-hoc analysis of data.

It is a first aspect of the present invention to provide a computer implemented method of performing ad-hoc analysis including the steps of: generating a metadata lookup structure based, at least in part, on the text index, the metadata lookup structure including metadata items associated with each of the textual information items, searching the text index using search queries, the searching step producing search results including textual information items matching the search query, compiling results of the text index search into aggregate information related to characteristics of the search results from the metadata items associated with each of the textual information items in the search results from the metadata lookup structure, and reporting the aggregate information. In one embodiment of the first aspect, the step of accessing information sources for a plurality of textual information items prior to generating the text index is provided.

In one embodiment of the first aspect, the step of generating a metadata lookup structure based, at least in part, on the text index includes the steps of: generating a plurality of metadata IDs, each metadata ID associated with at least a type of metadata, analyzing each textual information item to determine which metadata ID(s) are associated with the respective textual information item, and mapping each textual information item with the respective metadata ID(s) determined for it in the analyzing step.

In another embodiment of the first aspect, the step of generating a metadata lookup structure based, at least in part, on the text index includes the steps of: generating one or more metadata items associated with the textual information items, determining a quantity of the one or more metadata items, and dynamically allocating a portion of a computer memory component based, at least in part, on the determined quantity.

In yet another embodiment of the first aspect, the step of generating a metadata lookup structure based, at least in part, on the text index includes the steps of: generating one or more metadata items associated with the textual information items, determining a quantity of the one or more metadata items, and dynamically allocating a portion of a computer memory component based, at least in part, on the determined quantity. In this embodiment, the number of metadata items generated is not the same for all of the textual information items, In one embodiment of the first aspect, the metadata items may include date information, link information, author information, keyword information, sentiment information, demographic information, entity information, and/or language information. In one embodiment, the link information includes a Uniform Resource Locator. In another embodiment, the language information includes one or more language specific annotation. In another embodiment, the demographic information may be generated and includes at least one of age and gender of a text item author. In yet another embodiment, the language specific annotation may be provided by the textual information items. In yet another embodiment, the language specific annotation may determined by analyzing the textual information items.

In one embodiment of the first aspect, the textual information items include electronic data from one or more of Internet message boards, blogs and news groups. In another embodiment, the aggregate information may include date information, link information, author information, keyword information, sentiment information, demographic information, entity information, and/or language information pertaining to the search results.

In another embodiment of the first aspect, the text index may be updated after a predetermined time period. In one embodiment, the predetermined time period may be between five and fifteen minutes.

It is a second aspect of the present invention to provide a system for performing ad-hoc analysis including a computer server having access to information sources, the information sources including a plurality of textual information items, and a user computer device linked to the computer server. The user computer device includes software that performs the steps of: (a) generating a text index of the textual information items; (b) generating a metadata lookup structure based, at least in part, on the text index, the metadata lookup structure including metadata items associated with each of the textual information items; (c) searching the text index using search queries, the searching step producing search results including textual information items matching the search query; (d) compiling results of the text index search into aggregate information related to characteristics of the search results from the metadata items associated with each of the textual information items in the search results from the metadata lookup structure; and (e) reporting the aggregate information.

In one embodiment of the second aspect, the step of generating a metadata lookup structure based, at least in part, on the text index includes the steps of: generating a plurality of metadata IDs, each metadata ID associated with at least a type of metadata, analyzing each textual information item to determine which metadata ID(s) are associated with the respective textual information item, and mapping each textual information item with the respective metadata ID(s) determined for it in the analyzing step.

In another embodiment of the second aspect, the step of generating a metadata lookup structure based, at least in part, on the text index includes the steps of: generating metadata items associated with the textual information items, determining a quantity of the metadata items, and dynamically allocating a portion of a computer memory component based, at least in part, on the determined quantity.

In yet another embodiment of the second aspect, the step of generating a metadata lookup structure based, at least in part, on the text index includes the steps of: generating metadata items associated with the textual information items, wherein the number of metadata items generated is not the same for all of the textual information items, determining a quantity of the metadata items, and dynamically allocating a portion of a computer memory component based, at least in part, on the determined quantity.

In one embodiment of the second aspect, the metadata items may include date information, link information, author information, keyword information, sentiment information, demographic information, entity information, and/or language information.

In another embodiment of the second aspect, the aggregate information may include date information, link information, author information, keyword information, sentiment information, demographic information, entity information, and/or language information.

In another embodiment of the first aspect, the text index may be updated after a predetermined time period. In one embodiment, the predetermined time period may be between five and fifteen minutes.

From the foregoing disclosure and the following detailed description of various preferred embodiments it will be apparent to those skilled in the art that the present invention provides a significant advance in the art of data analysis.

Additional features and advantages of various preferred embodiments will be better understood in view of the detailed description provided below.

BRIEF DESCRIPTION OF THE DRAWINGS

The present invention will be understood and appreciated more fully from the detailed description in conjunction with the following drawings in which.

DETAILED DESCRIPTION

It will be apparent to those skilled in the art that many uses and variations are possible for the method and system for data analysis. The following detailed discussion of various exemplary embodiments will illustrate the general principles of the invention. Other embodiments will be apparent to those skilled in the art given the benefit of this disclosure.

Figure 1:
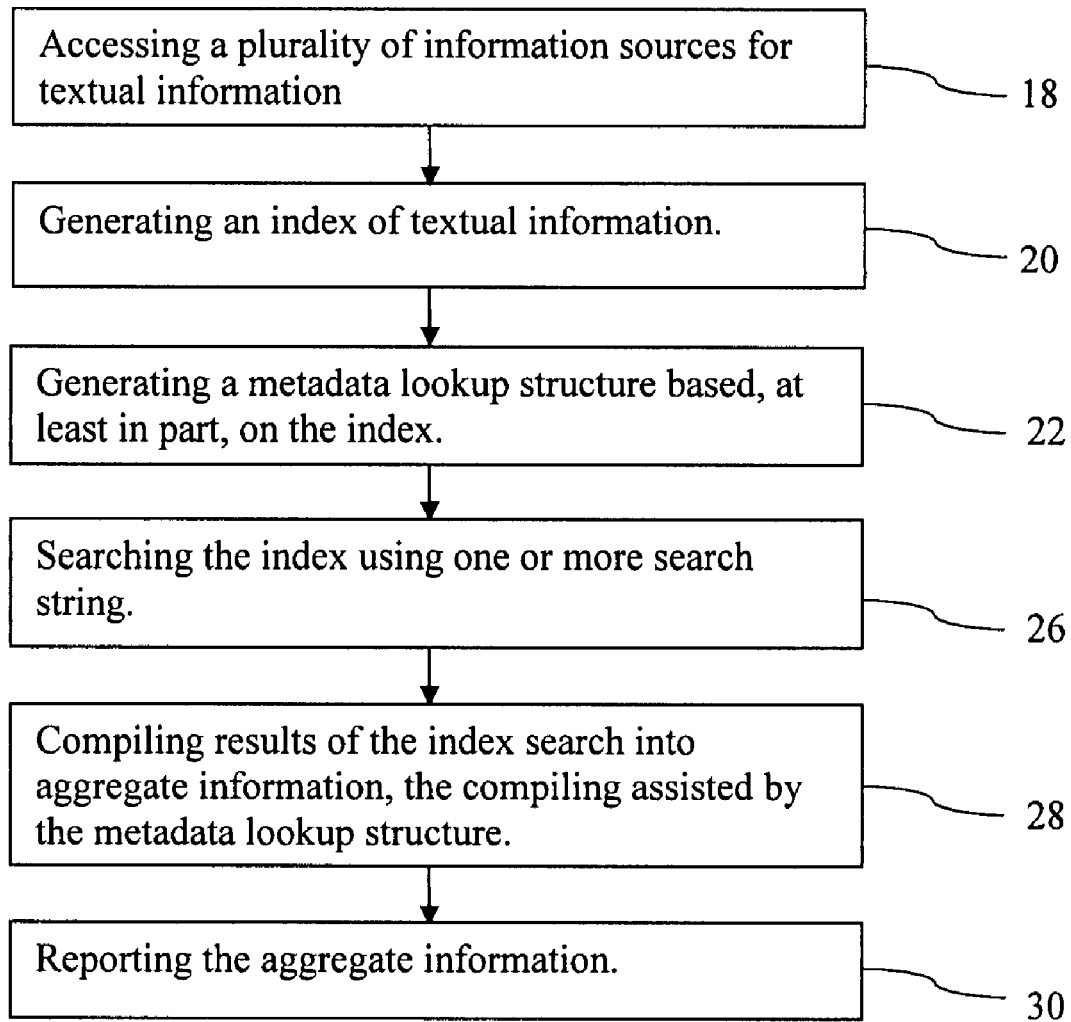
FIG. 1 is a flow diagram of one embodiment of the present invention.

As shown in FIG. 1, one embodiment of the present invention accomplishes this by generating 20 an index that not only includes typical keyword information but also additional metadata information such as links and date information. By building this information into the index, it allows for searching and analyzing this data.

Embodiments of the present invention then use the index to rapidly build 22 a metadata lookup structure, rather than requiring additional analytics to be run separately on the data. By leveraging the index structures themselves to build 22 a metadata lookup structure, embodiments of the invention allow for deep analysis without requiring separate time-consuming text mining steps.

In an exemplary embodiment, the first step in implementing this method is gathering data over which ad-hoc analysis is desired. This data or information may come from any information source 24. This data may include consumer generated media or social media such as boards, blogs, and newsgroups. It may also include content such as news media, press releases, website content, local content, networked content or anything else that can be rendered in digital form.

There are numerous well known methods for acquiring this data. The most common current method is via Hypertext Transfer Protocol (HTTP) requests for the data. These requests may be for semi-structured data such as those available in feeds (RSS, Atom, etc.) or unstructured data such as raw Hypertext Markup Language (HTML). Other methods may include accessing data located on local or networked computer servers or devices.

Once the data has been acquired, it is processed to generate 20 a text index of the data. In one embodiment, a full text index of the data is generated 20. There are numerous technologies available for this process. In the exemplary embodiment, Lucene from Apache© is used to create 20 the full-text index. Apache© Lucene is a "high-performance, full-featured text search engine library written entirely in Java" (http://lucene.apache.org). Numerous other full-text indexing solutions may also be suitable.

When data is processed to generate 20 a full-text index, it goes through a series of steps. Text is broken down into keywords. Additional metadata such as date, author or source may also be included during this process. In an exemplary embodiment, data may include structured information and/or unstructured information. Structured information may contain separate elements for each metadata type. In one embodiment, these elements may include a data element, a title element and a body element. Examples of structured data may include a structured XML format such as an RSS feed. Unstructured information may be processed to extract metadata types. Such processing may include screen scraping techniques, pattern matching techniques or any other known processing technique capable of extracting metadata information. Metadata that may be the subject of analysis may also be included in the index. For instance, if a user wants to be able to break down the items by date, the data being added may include the date of creation or publication as additional metadata.

Source and demographic data may also be added to the index for further annotation. For instance, the data source and author information may be added to the index. Furthermore, demographic data about the author such as gender and age may be added to the index to allow for demographic based searching and analysis. For demographics analytics, the age and/or gender of an author may be generated for each item. Using this demographic information, one embodiment of the present invention may generate a demographic breakdown such as the age breakdown of authors of items.

Various types of extraction algorithms may also be performed on the data to further annotate the index. This may include link extraction (determining HTML anchor reference to other data). It may also include various types of entity extraction, such as person name extraction or company name extraction. In one embodiment, the text may be examined to extract all proper names based on capitalization. In another embodiment, techniques based on large lists of company names or pattern recognition may also extract entities.

The index generation 20 process may be language neutral such that all items are processed identically regardless of language, or it can be language specific. In a language specific system, the language is identified. This identification may either be a configuration item provided to the system or through a dynamic language identification module. Once the language is identified, language specific processing may take place. For instance, language specific entity extraction may be used to extract names for a particular language.

Once the full-text index is generated 20, the internal index data structures are used to build 22 a metadata lookup structure. A full text index typically builds tables that map a particular keyword or attribute to corresponding data. For instance, the metadata lookup structure may include a table that lists all text items having a common date. This metadata lookup structure is designed for rapid searching for various attributes.

In an exemplary embodiment, the metadata lookup structure maps text items to metadata information. The metadata information is stored in a way that a metadata value may be retrieved for any item in the text index. Typically, index systems have an identification (ID) that represents a discrete item. Such an ID may represent a value or a numeric representation of a value. This may be used as a reference into the metadata lookup structure. Specifically, the metadata lookup structure maps text items to one or more IDs representing metadata values or numerical representations thereof. For instance, the index may return item #10 and the metadata lookup structure may be used to retrieve the metadata values associated with item #10. In this manner, the date value and author value of item #10 may be easily retrieved.

In an exemplary embodiment, each metadata value is assigned a metadata ID and an array is built 24 mapping text item IDs to a metadata ID. A metadata ID may represent a metadata value or a numeric representation of a metadata value. This array is built 24 by interrogating the text index for each type of metadata and assigning it an ID. The text index is also interrogated for the text items matching that metadata value(s) and that metadata ID(s) is added to the array and associated with the corresponding text item.

The metadata lookup structure may be implemented in a variety of ways. This may include many implementations, from a simple array that holds a metadata value for each item to a more complex structure that stores the metadata value in a more space efficient manner. Examples of such data structures include compressed, dynamic, "many-to-one" and indexed structures. In an exemplary embodiment, the metadata information is stored using a proprietary compression scheme. This metadata information may be stored in memory, on a disk, or in any other storage medium. An exemplary embodiment stores the data in memory for improved access speed.

A compressed structure references each item to conserve space. For example, a compressed structure may determine that an index has data from 200 unique dates. The compressed structure could assign each unique date a corresponding number (1-200) and then store the date and number as a single byte reference. The compressed structure may use a compressed number format such that smaller numbers are stored in fewer bytes than larger numbers. Furthermore, the assignment of reference numbers may be intelligent to make efficient use of space. For instance, smaller reference numbers may be used for items occurring frequently and larger reference numbers may be used for items occurring less frequently.

In a dynamic structure, the size of the data structure varies depending on the content. The dynamic structure first examines the items in the index and determines the necessary size of the structure such as how many metadata items does it need to store for an item and how many items are present. The dynamic structure then allocates the appropriate amount of memory.

The many-to-one structure allows multiple metadata items to be mapped to one item. Traditional methods create a fixed array with a set number of metadata items per item. However, some metadata items appear in different quantities. For instance, some items may be tagged with three different subjects while other posts might not be tagged at all. The structure allows for both, while not wasting memory space.

An indexed data structure includes a periodic offset index to improve lookup performance. Because metadata items may appear in different quantities and each metadata item may be variable in size, a periodic offset index provides a means for quickly determining where a metadata item is located in the data structure. Unlike a typical fixed-size array, the indexed data structure may not know the location of a specific offset. In a fixed-size array with each metadata item having 4 bytes, going to metadata item #1002 would only require navigating to offset #4008 (item #1002×4 bytes per item). Because the metadata items may vary for each item and the size of each metadata item is not necessarily fixed, a lookup table including an offset is helpful. For example, to find metadata item #1002, the indexed data structure may reference the lookup table (the lookup table returns an offset of metadata item #1000) to move directly to metadata item #1000 and then process through two metadata items to get to #1002. Without a lookup table, the size of each metadata item is unknown and the process would need to start at the beginning of the array and process all 1,002 entries.

Once the metadata lookup structure is generated, the system is ready for ad-hoc use. A user may provide a query using standard full text query syntax. For instance, "Harry Potter"

may be used as a query string. This query string is passed to the indexing system, which searches 26 the text index and produces the items in the text index matching this query.

As items are identified, the metadata lookup structure may then be used to retrieve 26 metadata information for the items found in the searching step. As this data is retrieved 26, it may be used to compile or aggregate 28 the search results based upon the metadata associated therewith. Compilation or aggregation 28 involves grouping items that share a common attribute.

For example, the system may aggregate 28 items found in the searching step based on date. In this situation, it would create a table of dates and a count of items associated with that date. As each item is processed, a counter may be incremented for that item.

Finally, this aggregate information is provided to the user. In an exemplary embodiment, this aggregate information is reported 30 to the user by displaying the aggregate information on a display device and/or by generating a hard-copy report of such aggregate information. This aggregate information may be displayed in a table format, graphical format, or any other known format. For example, date analysis may generate a table similar to the following:

| Mentions of "Harry Potter" by date | |
|---|---|
| 8/1/2006 | 1188 |
| 8/2/2006 | 1166 |
| 8/3/2006 | 986 |
| 8/4/2006 | 992 |
| 8/5/2006 | 738 |
| 8/6/2006 | 770 |
| 8/7/2006 | 436 |

Similarly, the system may aggregate 28 the search results based on other types of data such as links (HTML anchor tag references to other data). As each item is processed, links may be added to a table to produce a table of the most popular links.

Link analysis may produce a table similar to the following:

| Most Popular Links for posts mentioning "Harry Potter" | |
|---|---|
| http://www.jkrowling.com/ | 55 |
| http://www.cbc.ca/story/arts/national/2006/09/03/harrypotter... | 48 |
| http://www.mugglenet.com/ | 43 |

A wide variety of analytics may be generated with this method. Author information may be aggregated 28 to find authors that write about certain subject. Keyword analysis may be aggregated 28 to provide common keywords related to a query. Sentiment analysis may be aggregated 28 to give some indication of overall opinion about a certain subject.

Other analytics such as language, demographic, and video analytics may also be generated. For language analytics, the language of an item may be indexed 22 or may be otherwise determined. This may be accomplished by using language identifier metadata during indexing 22. With this language metadata, reports of language breakdowns may be generated. Such a language identifier may be commercially available. For demographics analytics, the age and/or gender of an author may be generated for each item. Using this demographic information, one embodiment of the present invention may generate a demographic breakdown such as the age breakdown of authors of items mentioning Harry Potter. For video analytics, the index may include video links in the items. One embodiment of the present invention can identify video links in posts based on standard pattern matching with known video sites and URL formats. This video metadata may be used to produce a report of the most cited videos for a given search query.

Extracted entities may be used to provide additional analytics. For instance, if person's names were extracted and annotated in the index, the system may provide a list of common person's names used in items matching the query.

The results of ad-hoc analysis may be used in many ways. Results may be used to track important dates or uncover important media sites related to query terms. For example, the "Harry Potter" query revealed that August 1 had a higher amount of "buzz" or popularity related to Harry Potter than other days. Also, the link analysis revealed that www.jkrowling.com (the website of the author of the Harry Potter book series) was the most popular link for the given time period.

Figure 2:
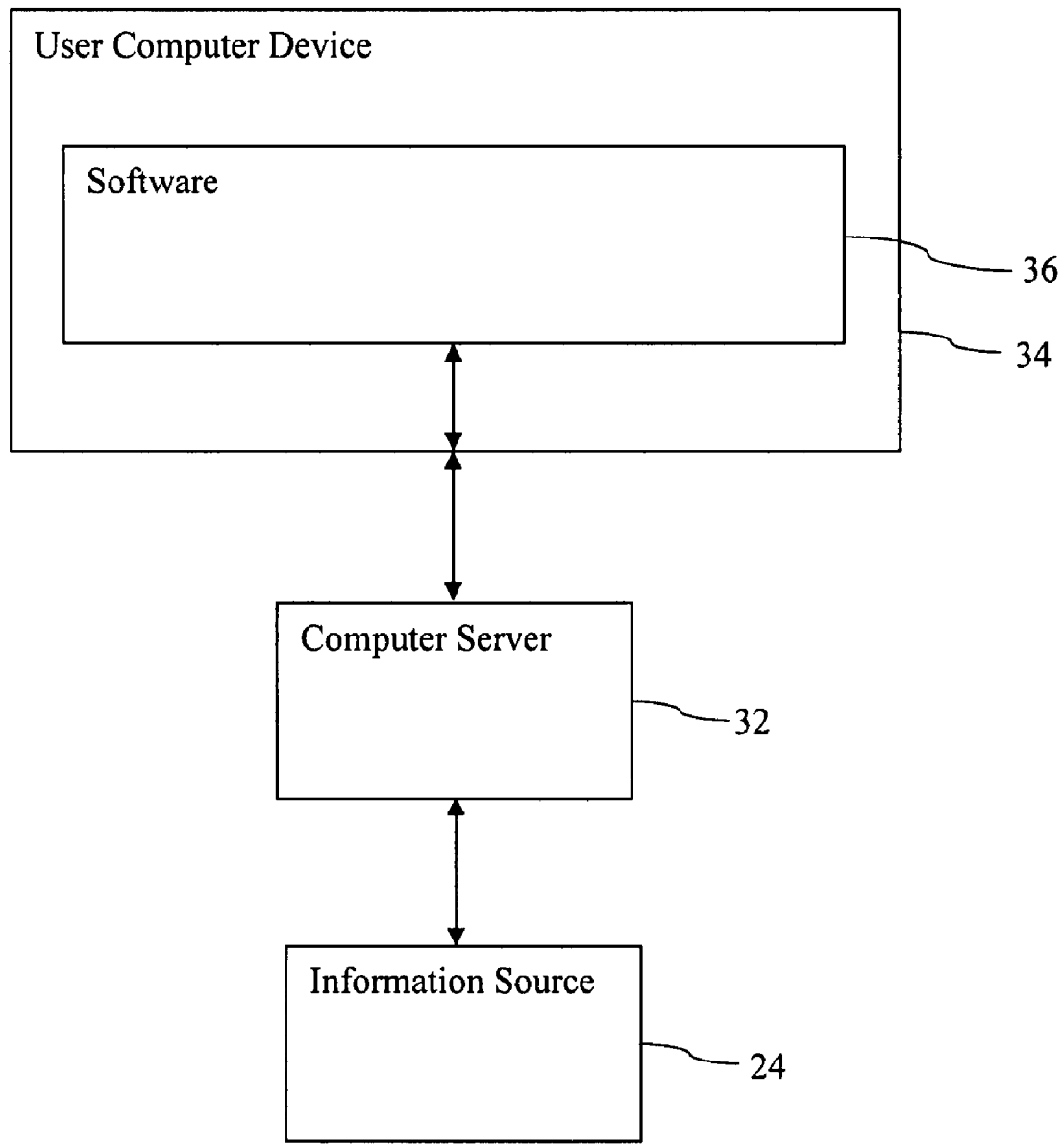
FIG. 2 is a view of an exemplary environment utilized in one embodiment of the present invention.

In one exemplary embodiment, the present invention is directed to a system for performing ad-hoc analysis. Such a system (as shown in FIG. 2) includes a computer server 32 and a user computer device 34. The computer server 32 is any server device capable of accessing information or data in an information source 24. This information or data may include consumer generated media or social media such as boards, blogs, and newsgroups. It may also include content such as news media, press releases, website content, local content, networked content or any other information that can be rendered in digital form.

In this exemplary system, the user computer device 34 is linked via data links (wired, wireless, and/or networked) to the computer server 32. The user computer device 34 includes software tools 36 operating thereon. These software tools 36 are configured to execute instructions to perform a method of ad-hoc analysis. This method generates a metadata lookup structure based, at least in part, on information or data gathered from one or more information source 24. The software tools 36 then search the one or more information source 24 for a search string. This search string may be any string of characters that a user desires to search. The search returns results that are compiled into aggregate information. As described above, the compiling of the results incorporates the metadata lookup table for improved speed and completeness. The use of the metadata lookup table also allows for various analytics to be run. The software 36 then reports the aggregate information. This reporting may include outputting the aggregate information to an output device such as a monitor, a printer or other output device.

This system may analyze the aggregate information based on a date, a link, an author, a keyword, a sentiment, a demographic, an entity, and/or a language. Similar to the Harry Potter example, a series of analytics may be performed to better understand various aspects of the source or content of the information.

It should be understood that the computer server 32 on which the exemplary system is operating (and which may appear in the appended claims) may be a single computer server 32, a networked group of computer servers 32, or any other networked computer device or computerized device or system of computer devices or computerized devices on which the tools and/or processes of the exemplary embodiments may operate. It is also to be understood that the user computer device 34 may also comprise the server 32 or be included with the server 32 system.

Figure 3:
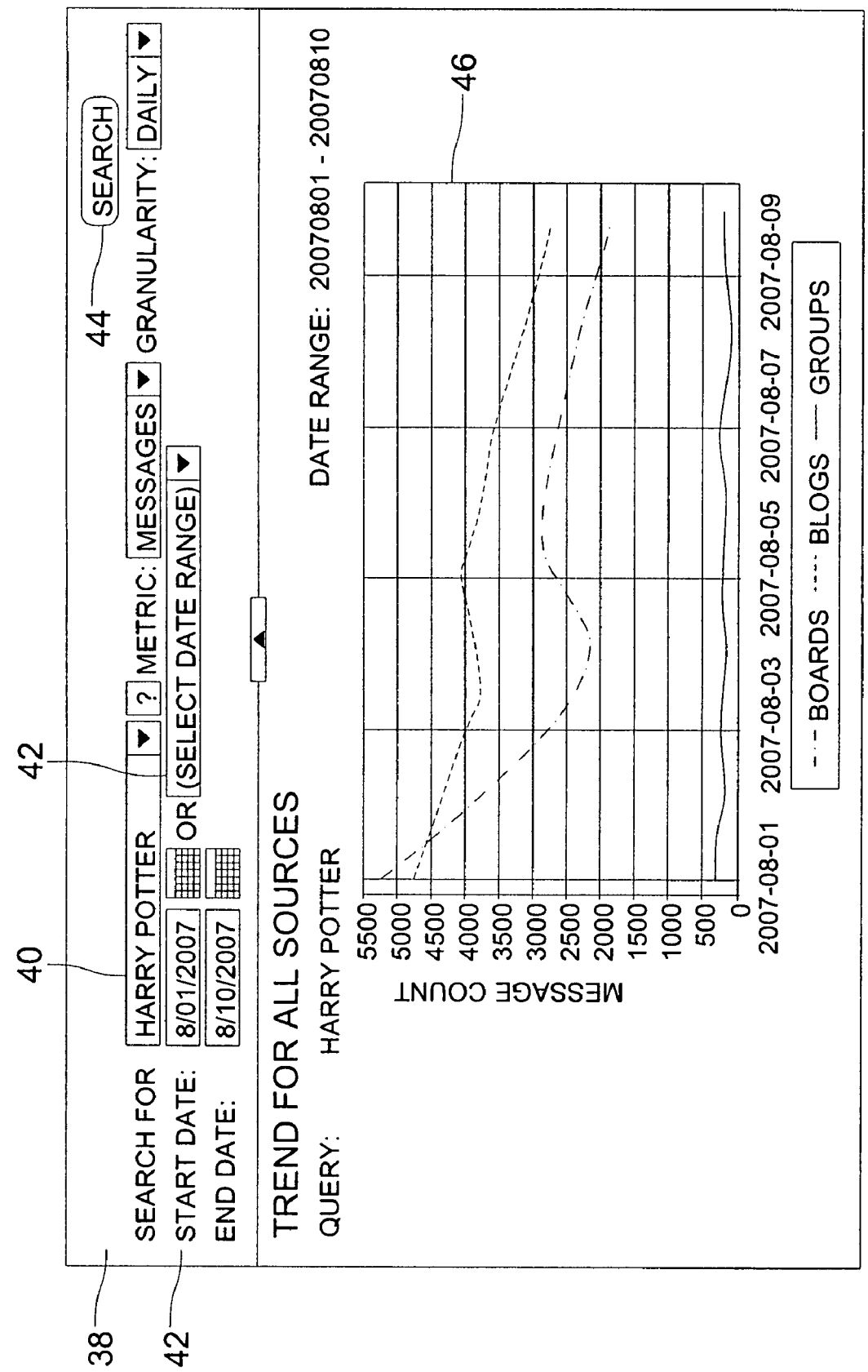
FIG. 3 is an exemplary computer screenshot from one embodiment of the present invention.

FIG. 3 depicts an exemplary computer screenshot of one embodiment of the present invention. This screenshot is an exemplary screenshot of what a user may see as aggregated information after searching for "Harry Potter." The search interface may include an input area 38 for inputting a search string 40, date parameters 42 and other options. When a user wishes to search for "Harry Potter," the user may input that term into the input area 38. Also, the user may input specific dates 42 or a date range 42 (such as the last 90 days) for which to search. Any other search commands or Boolean operators may be used in the search query as known to those of ordinary skill in the art. The user may then click on (or otherwise actuate or activate) the search button 44 to begin searching. After the search is complete, the system may output a graphical representation 46 of aggregated results for the given data parameters. In this example, the search for "Harry Potter" between Aug. 1, 2007 and Aug. 10, 2007 generated a graph 46 showing how many messages were found. In addition, the graph may be broken down to show how many messages were found on message boards, blogs, and groups. The graph 46 in this embodiment may be displayed in various levels of detail based on user-selected display options.

Following from the above description and invention summaries, it should be apparent to persons of ordinary skill in the art that, while the methods and systems herein described constitute exemplary embodiments of the present invention, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the identified advantages or objects of the invention disclosed herein in order to fall within the scope of the claims, since inherent and/or unforeseen advantages of the present invention may exist even though they may not have been explicitly discussed herein.

What is claimed is:

1. A computer implemented method for performing ad-hoc analysis, the method comprising:
    generating, using a processor, a text index of a plurality of text items found in at least one electronic information source;
    generating, using a processor, a metadata lookup structure based, at least in part, on the text index, the metadata lookup structure including one or more metadata items associated with each of the text items, wherein generating the metadata lookup structure comprises interrogating the text index for one or more text items matching the one or more metadata items;
    facilitating a user search of the text index using one or more search queries, the searching producing search results including one or more text items matching the one or more search queries;
    retrieving one or more metadata items using the metadata lookup structure based on the search results;
    compiling results of the text index search into aggregated information based on the retrieved metadata items associated with each of the one or more text items in the search results, wherein the metadata lookup structure is used to retrieve the one or more metadata items associated with the one or more text items found in the search results; and
    reporting the aggregated information.

2. The method of claim 1, further comprising:
    prior to generating the text index, accessing a plurality of information sources for a plurality of text items.

3. The method of claim 1, wherein generating a metadata lookup structure based, at least in part, on the text index includes:
    generating a plurality of metadata identifiers (IDs), each metadata ID associated with at least a type of metadata;
    analyzing each text item to determine which metadata ID(s) are associated with the respective text item; and
    mapping each text item with the respective metadata ID(s) determined for it in the analyzing.

4. The method of claim 1, wherein generating a metadata lookup structure based, at least in part, on the text index includes:
    generating one or more metadata items associated with the text items;
    determining a quantity of the one or more metadata items; and
    dynamically allocating a portion of a computer memory component based, at least in part, on the determined quantity.

5. The method of claim 1, wherein generating a metadata lookup structure based, at least in part, on the text index includes:
    generating one or more metadata items associated with the text items, wherein the number of metadata items generated is not the same for all of the text items;
    determining a quantity of the one or more metadata items; and
    dynamically allocating a portion of a computer memory component based, at least in part, on the determined quantity.

6. The method of claim 1, wherein the one or more metadata items includes at least one of date information, link information, author information, keyword information, sentiment information, demographic information, entity information, and language information.

7. The method of claim 6, wherein the link information includes a Uniform Resource Locator.

8. The method of claim 6, wherein the demographic information is generated and includes at least one of age and gender of a text item author.

9. The method of claim 6, wherein the language information includes one or more language specific annotation.

10. The method of claim 9, wherein the language specific annotation is provided by the text items.

11. The method of claim 9, wherein the language specific annotation is determined by analyzing the text items.

12. The method of claim 1, wherein the text items include electronic data from one or more of Internet message boards, blogs and news groups.

13. The method of claim 1, wherein the aggregate information includes at least one of date information, link information, author information, keyword information, sentiment information, demographic information, entity information, and language information pertaining to the search results.

14. The method of claim 1, wherein the text index is updated after a time period.

15. The method of claim 14, wherein the time period is between five and fifteen minutes.

16. A system for performing ad-hoc analysis, comprising:
    a computer server having access to one or more information sources, the one or more information sources including a plurality of text items; and
    a user computer device linked via one or more data links to the computer server, the user computer device including software configured to perform:
    generating a text index of the text items;
    generating a metadata lookup structure based, at least in part, on the text index, the metadata lookup structure including one or more metadata items associated with each of the text items;

facilitating a search of the text index using one or more search queries, the searching producing search results including one or more text items matching at least one of the one or more search queries;

retrieving one or more metadata items using the metadata lookup structure based on the search results;

compiling results of the text index search into aggregated information based on the retrieved metadata items associated with each of the one or more text items in the search results; and reporting the aggregated information.

17. The system of claim 16, wherein generating a metadata lookup structure based, at least in part, on the text index includes:

generating a plurality of metadata IDs, each metadata ID associated with at least a type of metadata;

analyzing each text item to determine which metadata ID(s) are associated with the respective text item; and mapping each text item with the respective metadata ID(s) determined for it in the analyzing.

18. The system of claim 16, wherein generating a metadata lookup structure based, at least in part, on the text index includes:

generating one or more metadata items associated with the text items;

determining a quantity of the one or more metadata items; and dynamically allocating a portion of a computer memory component based, at least in part, on the determined quantity.

19. The system of claim 16, wherein generating a metadata lookup structure based, at least in part, on the text index includes:

generating one or more metadata items associated with the text items, wherein the number of metadata items generated is not the same for all of the text items;

determining a quantity of the one or more metadata items; and dynamically allocating a portion of a computer memory component based, at least in part, on the determined quantity.

20. The system of claim 16, wherein the one or more metadata items includes at least one of date information, link information, author information, keyword information, sentiment information, demographic information, entity information, and language information.

21. The system of claim 16, wherein the aggregate information includes at least one of date information, link information, author information, keyword information, sentiment information, demographic information, entity information, and language information pertaining to the search results.

22. The system of claim 16, wherein the text index is updated after a time period.

23. The system of claim 22, wherein the time period is between five and fifteen minutes.

* * * * *